United States Patent Office 3,133,892
Patented May 19, 1964

3,133,892
POLYMERIZABLE COMPOSITIONS OF ETHYLENICALLY UNSATURATED AMIDES
Frank Fekete, Monroeville, Pa., assignor to
H. H. Robertson Company
No Drawing. Filed Apr. 26, 1960, Ser. No. 24,674
13 Claims. (Cl. 260—33.4)

This invention relates to polymerizable compositions including ethylenically unsaturated alkylolated amides and to a method for preparing and curing such compositions. More specifically the compositions of this invention include a binary curing reagent which comprises firstly a mineral acid selected from the class consisting of phosphoric and sulfuric acid and secondly an ester selected from the class consisting of dibutyl tin dilaurate, dibutyl tin dichloride, tri-n-butyl borate and diphenyl phosphonite. Such compositions possess improved curing properties and also have certain improved physical properties in the resulting cured resin.

PRIOR ART

Ethylenically unsaturated methylolated amides have been homopolymerized in the presence of vinyl-polymerization catalysts such as benzoyl peroxide to form homopolymers which can be cross-linked through condensation at the methylolated amide sites. Methylolation of the amides may occur prior to or subsequent to the vinyl polymerization. As examples, a homopolymer may be formed from methylolated acrylamide by vinyl addition, British Patent 467,492. Alternatively a homoploymer may be formed by vinyl addition of acrylamide; thereafter the available amide sites may be methylolated with formaldehyde or similar methylol precursors to yield the desired methylolated amide polymer. Instead of methylolation, other alkylolation may be employed by using aldehydes other than formaldehyde.

Copolymers of ethylenically unsaturated methylolated amides have been formed by vinyl addition with various ethylenically unsaturated monomers such as styrene, vinyl toluene, acrylic acid, methacrylic acid, acrylic esters, methacrylic esters, acrylonitrile, acrolein; and various substituted derivatives thereof. See U.S. Patents 1,933,052; 2,718,515; 2,848,434, British Patent 467,402. Such copolymers can be cross-linked by condensation through the methylolated or alkylolated amide sites.

Interpolymers of ethylenically unsaturated methylolated amides have been formed by vinyl addition with two or more ethylenically unsaturated monomers as above enumerated. Such interpolymers can be cross-linked by condensation through the methylolated amide sites. See U.S. Patent 2,739,137. Cross-linking of the homopolymers, copolymers and interpolymers through the methylolated amide sites is the "cure" which forms a three-dimensional, thermoset resin.

By varying the constituents of the vinyl addition polymers, the properties of the resulting cured resin can be regulated. Such cured resins find utility as surface finishes for appliances, panels, automotive equipment and the like. The curing of the resins is accomplished by heating a polymer-coated surface to cure temperatures of about 177° C. (350° F.) for a cure period of about 30 to 60 minutes.

THE PRESENT INVENTION

According to the present invention, vinyl condensation polymers including ethylenically unsaturated alkylolated amides can be cured at lower cure temperatures, frequently in shorter periods of cure time. The cured resins of this invention exhibit increased adhesion on metal surfaces; exhibit increased resistance to mar and stain; exhibit increased hardness without loss of flexibility; exhibit increased thermal stability; exhibit increased color stability. The polymerizable compositions, prior to cure, exhibit improved flow properties and increased storage life. The cured resins possess flame retardant properties.

Incorporated into solutions of the polymers containing ethylenically unsaturated alkylolated amides is a quantity of a binary curing reagent including a mnieral acid and an organic ester. Satisfactory curing of the present polymerizable compositions is achieved at temperatures below 100° C. in reasonable curing time such as from about 10 to about 30 minutes. Conveniently the present resins can be cured by heat from an infra-red radiant heat source.

In co-pending application Serial Number 8,906, filed February 16, 1960 (now abandoned), and assigned to the assignee of the present application, that improvement in curing of the subject polymers has been described which results from the incorporation with the polymer of quantities of sulfuric acid, phosphoric acid and their mixtures. The present invention relates to further improvement in the curing of the same polymers which results from the incorporation not only of a quantity of the mineral acid aforesaid but also a quantity of certain organic esters. Neither the organic esters nor the mineral acids alone achieves the improvement in curing properties which results from their combined use.

Commercially available phosphoric acid contains about 85 percent by weight of phosphoric acid. Phosphoric acid concentrations in the range from 20 to 85 percent are suitable. Concentrated sulfuric acid, containing about 93 percent of sulfuric acid in water, is objectionable because of the difficulty in mixing it with resin, although the resulting mixture is aceptable as a polymerizable composition. Preferably the sulfuric acid concentration is about 20 to 70 percent. Sulfuric acid and phosphoric acid, if desired, may be added together. Both materials have a molecular weight of 98.

The preferred esters include those selected from the class consisting of dibutyl tin dilaurate, dibutyl tin dichloride, tri-n-butyl borate and diphenyl phenyl phosphonate.

POLYMERS INCLUDING ETHYLENICALLY UNSATURATED MEHTYLOLATED AMIDES

Typical ethylenically unsaturated amides include acrylamide, methacrylamide, ethyl acrylamide, butyl acrylamide, and similar alkyl, aryl, alkaryl and aralkyl substituted acrylamides.

Preferred polymers for this insulation include from 10 to 50 parts by weight of ethylenically unsaturated amide and from 90 to 50 parts by weight of at least one ethylenically unsaturated reactive monomer.

Homopolymers, copolymers and interpolymers of ethylenically unsaturated amides can be methylolated by reacting the polymers with formaldehyde or similar methylol precursors such as paraformaldehyde whereby the amide sites of the polymer are converted to methylolated amide sites. The methylolation reaction is described in U.S. Patent 2,864,862 for acrylamide alone.

A preferred interpolymer of the present invention includes (1) An amide selected from the class consisting of acrylamide and methacrylamide
(2) A vinyl benzene selected from the class consisting of styrene and vinyl toluene
(3) An acrylic ester selected from the class consisting of methyl acrylate, ethyl acrylate, butyl acrylate and 2-ethylhexyl acrylate

*Example I.—Preparation of Methylolated Amide Interpolymer*

The following ingredients are charged into a reaction flask equipped with a stirrer, reflux condenser, thermometer and heating apparatus.

| Ingredients: | Parts by weight |
| --- | --- |
| Acrylamide (monomer) | 180 |
| 2-ethyl hexyl acrylate (monomer) | 540 |
| Vinyl toluene (monomer) | 480 |
| n-Butyl alcohol (solvent) | 1200 |
| Cumene hydroperoxide (catalyst) | 12 |
| Tert-butyl mercaptan (chain terminating agent) | 4.2 |

The flask is stirred and heated to a reflux temperature of 110 to 120° C.. The flask is held at reflux temperature throughout the vinyl interpolymerization process which requires from about four to about twelve hours. Samples of the flask contents are withdrawn periodically for Gardner-Holdt viscosity readings which indicate the progress of the vinyl interpolymerization. The reaction is considered to be complete when a Gardner-Holdt viscosity in the range of W to Z is obtained.

The solution of interpolymers in n-butyl alcohol is maintained at the reflux temperature and 360 parts by weight of a solution of formaldehyde in n-butyl alcohol (butyl formcel) is added for methylolation of the interpolymer. As a methylolation catalyst, 4.0 parts by weight of maleic anhydride is added. Methylolation is complete after about one hour of reflux. Preferably the molar quantity of formaldehyde is twice the molar quantity of acrylamide employed as a starting material to provide sufficient methylol groups to replace both hydrogen atoms of the amide group whereby two methylol groups appear at each amide site of the interpolymer.

The reaction flask is cooled to room temperature and the solution is filtered to remove any gel particles. The filtered solution is stored for future use as a polymerizable composition. While n-butyl alcohol is preferred as the reaction solvent because of its compatibility with the ingredients, it is possible by distillation to recover some of the n-butyl alcohol for reuse. The recovered n-butyl alcohol may be replaced by other compatible solvents such as xylene or toluene in the polymerizable composition.

The polymerizable composition contains interpolymers of the starting materials which have methylolated amide sites available for cross-linking of the interpolymers during a curing treatment. The composition may be sprayed on metal surfaces as a coating. The coating is cured by heating in an oven for one-half hour at 177° C. (350° F.). During the curing treatment, methylol condensation occurs between methylolated amide sites of the interpolymers with resultant elimination of water and formation of a methoxy-methyl linkage between amide sites of the interpolymers. The resulting cross-linked resin is thermoset and possesses valuable properties as a metal coating.

The cured coating possesses hardness and flexibility. The cured coating has good resistance to mar and stain. Its adhesion to metals such as steel and aluminum is good. It has a high gloss as evidenced by its ability to reflect daylight. Its weather resistance is good. Pigments can be blended into the polymerizable composition to achieve colored coatings without interfering with the herein-mentioned properties of the coating. In the absence of pigmentation, the coatings possess excellent clarity.

Suitable ethylenically unsaturated amide containing components of the present resins include acrylamide, methacrylamide, N-substituted acrylamides and methacrylamides, such as N-tert-butyl, N-octyl, N-decyl, N-ethyl, N-butyl, N-propyl, N-methyl.

The ethylenically unsaturated reactive monomers entering into the interpolymers of this invention may include styrene, substituted styrene derivatives such as vinyl toluene, methyl styrene, etc.; acrylates and methacrylates; vinyl chloride, vinyl fluoride, vinylidene chloride, vinyl phosphonates, vinyl borates, vinyl and acrylate type silicone derivatives, acrylonitrile, methacrylonitrile vinyl propionate, vinyl stearate, allyl derivatives, divinyl and diallyl derivatives, diacrylate and dimethacrylate derivatives, acrylic and methacrylic acids, vinyl acetate, butadiene, chlorinated styrene and vinyl toluene derivatives, bis-beta-chlorovinyl phosphonate, and the like.

Solvents useful as a vehicle for the interpolymerization must be compatible with the starting ingredients and the resultant interpolymers. Normal butyl alcohol is a preferred solvent. Other suitable solvents include sec-butyl alcohol, tert-butyl alcohol, n-propyl alcohol, isopropyl alcohol, ethanol, and combinations of the recited alcohols with xylene, benzene, toluene and ketones such as methyl ethyl ketone, methyl isobutyl ketones and the like.

While methylolated amide sites are preferred in the interpolymer for cross-linking, other alkylols may be employed, derived for example, from acetaldehyde, propyl aldehyde, butyl aldehyde and the like.

The catalyst employed in the interpolymerization reaction is one which promotes vinyl addition such as cumene hydroperoxide, methyl ethyl ketone peroxide, benzoyl peroxide, p-chlorobenzoyl peroxide, t-butyl peroxide, t-butyl perbenzoate, azo-bis-isobutyronitrile and the like.

Chain terminators are preferred additives in the interpolymerization reaction. Suitable chain terminators include n-butyl mercaptan, t-butyl mercaptan, t-octyl mercaptan, t-dodecyl mercaptan, t-tetradecyl mercaptan, t-hexadecyl mercaptan, mixed tertiary alkyl mercaptans, phenyl ethyl mercaptan, methyl mercaptan, ethyl mercaptan, butyl mercaptan, thiophene, ethyl mercaptoethanol and the like.

Suitable catalysts for promoting the alkylolation process which, as herein stated, may employ aldehydes other than formaldehyde, include maleic anhydride, oxalic acid, p-toluene sulfonic acid, sulfuric acid and the like.

The monomer proportions employed as starting materials for the interpolymers can be varied over rather wide ranges. The ethylenically unsaturated amide may comprise from 100 percent of the monomer, in the case of homopolymers, to about 5 percent of the monomer, in the case of copolymers and interpolymers. With increased proportions of the ethylenically unsaturated amide, the resulting polymer will have increasing numbers of available amide sites for cross-linking.

Where all of the amide sites are completely methylolated (as in the case where two moles of formaldehyde are employed for each mole of the amide) the maximum number of cross-linking sites is presented. Where less than two moles of formaldehyde are employed for each mole of the amide, fewer cross-linking sites are presented. The properties of the resulting thermoset resin thus can be controlled in part by regulating the extent of methylolation. In general, at least one-half mole of formaldehyde should be introduced into the interpolymer for each mole of the amide to achieve satisfactory cure. Where N-substituted amides are employed in the interpolymer formulation, their presence should be considered in determining the quantity of formaldehyde which is introduced into the interpolymer by methylolation.

Additional examples of the interpolymer formulations of this invention are tabulated in Table A. The formulation procedure is substantially the same as set forth in detail for the interpolymerization and methylolation for Example I.

TABLE A.—FORMULATION OF METHYLOLATED INTERPOLYMERS

| Example | Parts by weight | | | | |
|---|---|---|---|---|---|
| | I | II | III | IV | V |
| Ingredients: | | | | | |
| Acrylamide | 180 | 180 | 180 | 120 | 180 |
| Vinyl toluene | 480 | 480 | 480 | 636 | 480 |
| Methyl Acrylate | | | 540 | 144 | |
| Butyl acrylate | | 540 | | | |
| 2-ethyl hexyl acrylate | 540 | | | 300 | |
| Bis-beta-chloro-vinyl phosphonate | | | | | 360 |
| Cumenehydroperoxide [1] | 12 | 12 | 12 | [6] 24 | 180 |
| t-Butyl mercaptan [2] | 4.2 | 8.4 | 18 | 6 | 12 |
| n-Butyl alcohol [3] | 1,200 | 1,200 | 1,200 | 1,200 | 4.2 |
| n-Butyl formcel [4] | 360 | 360 | 360 | 240 | 1,200 |
| Maleic anhydride [5] | 4 | 4 | 4 | 3.6 | 360 |
| | | | | | 4 |

[1] Vinyl addition catalyst.
[2] Chain terminating agent.
[3] Solvent.
[4] Methylol-group source.
[5] methylolation catalyst.
[6] 12 parts cumene hydroperoxide added initially; 6 parts added after 3 hours reflux; 6 parts added after 3 more hours reflux.

Samples of the methylolated interpolymers shown in Table A were prepared for use as surface coatings. To avoid "cratering" of the resultant surface coatings, 0.5 percent by weight of dimethyl silicone fluid was mixed in each sample.

A film of each sample was applied to a zinc-coated steel coupon which was heated to an elevated temperature for a controlled period of time. The resulting coated coupon was tested by several conventional coating evaluations as follows:

A. *Cross hatch adhesion test.*—A thin coating of the polymerizable composition is applied to a steel coupon and cured by thermal exposure. The cured coating is scribed by a sharp instrument such as a knife blade in six parallel lines about 0.1 inch apart; six additional parallel lines are scribed about 0.1 inch apart perpendicular to the first six lines. Twenty-five squares of approximately 0.1 square inch area are formed by the intersecting scribed lines. A piece of adhesive cellophane tape is applied to the exposed surface over the twenty-five squares. The tape, when securely adhered to the surface, is pulled off slowly at an angle of 135 degrees with respect to the surface. The number of squares of coating which remain intact is observed. That number is multiplied by four to indicate the percentage adhesion. If all twenty-five squares remain intact, the percentage adhesion is 100.

B. *Flexibility test.*—One corner of the cured, coated steel coupon described in paragraph A above is placed at a predetermined mark in the jaws of pliers. The panel is bent through 90 degrees. The panel then is bent back to its original flat position. The test results are observed by the operator and reported poor, fair, good or excellent flexibility according to the observable cracking and changes in the twice bent coating.

C. *Mar resistance test.*—This test compares hardness of coating. The cured, coated steel coupon described in paragraph A is tested by drawing a fingernail of the observer over the surface at approximately a 45 degree angle at approximately four pounds pressure. The observer records the results as poor, fair, good or excellent according to the visible impression remaining on the coating. Poor coatings exhibit an unremovable scratch in the test. Excellent coatings exhibit no marks when scratched with greater than usual fingernail pressure.

D. *Sward hardness test.*—This test employs a rocker consisting of two 4-inch diameter metal rings spaced 1-inch apart and weighted on one side. The rocker is placed on the leveled test surface and allowed to oscillate as a pendulum. Twice the number of oscillations required for the amplitude to diminish from one predetermined value to another predetermined value is reported as the Sward hardness value. Higher values indicate greater hardness. Any bubbles, eyeholes, specks or dust on the surface interfere with the determination.

E. *Clarity.*—Each coating was observed to determine the clarity of the cured film. The clarity is reported as clear, slightly hazy, hazy or cloudy.

F. *Pencil hardness.*—This test involves drawing sharpened points of writing pencils at a 45 degree angle across the cured surface. The softest pencil which leaves a permanent impression on the surface is noted; its hardness (H, 2H, 3H, 4H, 5H, 6H) is recorded as the pencil hardness value of the coating.

In the following Table B, the properties of methylolated interpolymers are reported. In each instance a sample of the interpolymer solution, without additives, was applied to a zinc coated steel coupon.

TABLE B.—PROPERTIES OF METHYLOLATED INTERPOLYMERS

| Resin | Test | Cure temperature, °C. | Sward Hardness, percent | Flexibility | Mar resistance |
|---|---|---|---|---|---|
| I | i | 150 | h | Good | Fair-to-good. |
| | ii | 125 | f | do | Poor. |
| II | i | 150 | h | do | Fair-to-good. |
| | ii | 125 | f | do | Poor. |
| IV | i | 150 | h | do | Fair. |
| | ii | 125 | h | Fair | Poor. |

NOTE: In all tests above, the cure time was ten minutes. The films in all tests were clear.

It will be observed from Table B that the methylolated interpolymers alone will achieve a film at cure temperatures of 125° and 150° C. which is not commercially acceptable. In most instances the film exhibited severe "eyeholes," i.e., bubbles of entrapped gases within the film. Such eyeholes can be avoided by the addition of a small quantity of dimethyl silicone fluid to the polymerizable mixture.

The following Table C presents the properties of the present polymerizable mixtures to which 0.5 percent by weight of dimethyl silicone fluid has been added. The clarity of all test products was reported as clear.

TABLE C.—PROPERTIES OF METHYLOLATED INTERPOLYMERS

[0.5 percent by weight of dimethyl silicone added]

| Resin | Test | Cure temperature, °C. | Cure time, minutes | Sward hardness, percent | Flexibility | Mar resistance |
|---|---|---|---|---|---|---|
| I | iii | 150 | 10 | 40 | good | Fair-to-good. |
| II | iv | 125 | 10 | f | do | Poor. |
| | iii | 125 | 10 | 50 | do | Fair-to-good. |
| IV | iv | 150 | 10 | f | Fair | Poor. |
| | iii | 100 | 10 | h | good | Good. |
| | iv | 125 | 10 | f | Fair-to-good | Poor. |

It will be observed from Table C (in contrast to Table B) that the problem of eyeholes can be obviated by the use of dimethyl silicone.

As described in co-pending application Serial Number 8,906, filed February 16, 1960, now abandoned, the cure of the present methylolated interpolymers can be improved by the incorporation of a sulfuric acid, phosphoric acid or their mixtures. The required cure time and temperature is lower and some of the resultant properties are improved. Table D sets forth the results of tests carried out with the described inclusion of sulfuric acid, phosphoric acid and their mixtures.

In all cases the resulting resin films were clear unless otherwise noted. The flexibility and mar resistance likewise were good unless otherwise noted.

quate cures were obtained at temperatures of 100 to 125° C. and, in some instances at temperatures as low as 80° C.

According to the present invention, the curing of the present methylolated interpolymers is further improved by the inclusion of firstly a quantity of sulfuric acid, phosphoric acid or their mixtures and secondly a quantity of an ester selected from the class consisting of dibutyl tin dilaurate, dibutyl tin dichloride, tri-n-butyl borate and diphenyl phenyl phosphonite. The inclusion of the recited esters without the recited acid does not improve the curing properties of the methylolated interpolymers significantly. However the combinations of the recited esters and the recited acid permits curing of the polymerizable methylolated interpolymers at temperatures below TABLE D.—PROPERTIES OF METHYLOLATED INTERPOLYMERS
[Phosphoric acid added; sulfuric acid added]

| Resin | Test | Phosphoric acid, weight percent | Sulfuric acid, weight percent | Cure temperature, ° C. | Cure time, minutes | Sward hardness, percent | Notes |
|---|---|---|---|---|---|---|---|
| I | v | 3 | 0 | 177 | 10 | 52 | |
|   | vi | 3 | 0 | 150 | 10 | 48 | |
|   | vii | 3 | 0 | 125 | 10 | 40 | c |
|   | viii | 3 | 0 | 100 | 10 | 38 | c, d |
|   | ix | 0 | 3 | 177 | 10 | i | |
|   | x | 0 | 3 | 150 | 10 | i | |
|   | xi | 0 | 3 | 125 | 10 | 46 | |
|   | xii | 0 | 3 | 80 | 30 | 42 | a, d |
|   | xiii | 3 | 3 | 177 | 10 | -------- | l, b |
|   | xiv | 3 | 3 | 150 | 10 | -------- | l, b |
|   | xv | 3 | 3 | 125 | 10 | -------- | l, d |
|   | xvi | 3 | 3 | 100 | 30 | -------- | l, b |
|   | xvii | 3 | 3 | 80 | 30 | -------- | l, b |
| II | v | 3 | 0 | 150 | 10 | 46 | |
|   | vi | 3 | 0 | 125 | 10 | 44 | |
|   | vii | 3 | 0 | 100 | 30 | 42 | |
|   | viii | 3 | 0 | 100 | 10 | 40 | d |
| III | i | 0 | 3 | 150 | 10 | h | |
|   | ii | 0 | 3 | 125 | 10 | 66 | c |
|   | iii | 0 | 3 | 100 | 30 | 64 | c |
|   | iv | 0 | 3 | 80 | 30 | h | d |
|   | v | 3 | 3 | 125 | 10 | 62 | |
|   | vi | 3 | 3 | 100 | 30 | 60 | |
|   | vii | 3 | 3 | 80 | 30 | h | c, d |
| IV | v | 3 | 0 | 100 | 10 | -------- | |
|   | vi | 3 | 0 | 125 | 10 | -------- | |
|   | vii | 3 | 0 | 100 | 30 | -------- | d, j |
|   | viii | 0 | 3 | 125 | 10 | 62 | c |
|   | ix | 0 | 3 | 100 | 30 | 54 | a |
|   | x | 0 | 3 | 80 | 30 | 42 | d |
| V | i | 0 | 3 | 125 | 10 | 62 | c |
|   | ii | 0 | 3 | 100 | 30 | 54 | a |
|   | iii | 0 | 3 | 80 | 30 | 42 | d |
|   | iv | 3 | 3 | 125 | 10 | h | a |
|   | v | 3 | 3 | 100 | 30 | 56 | a |
|   | vi | 3 | 3 | 80 | 30 | 42 | |

Notes:
(a) Flexibility: fair.
(b) Mar resistance: fair.
(c) Flexibility: fair-to-good.
(d) Mar resistance: fair-to-good.
(f) Coating too soft to determine Sward Hardness.
(h) Coating exhibited eyeholes; Sward Hardness could not be determined.
(i) Particles on surface prevented determination of Sward Hardness.
(j) Slight haze on film.
(k) Mar resistance: poor.
(l) Flexibility: poor.
*Infra-red heating.

It appears from Table D that satisfactory curing of the present methylolated interpolymers results at lower temperatures when sulfuric acid, phosphoric acid or their mixtures are included in the polymerizable solution. Adequate 100° C. and, in some instances, at temperatures as low as 50° C. and 60° C.

The curing properties of the present polymerizable solutions are set forth in the following Tables E (dibutyl tin dilaurate), F (dibutyl tin dichloride), G (tri-n-butyl borate), and H (diphenyl phenyl phosphonite). In all tests, the clarity of the product was clear, the flexibility good and the mar resistance good unless otherwise indicated. Each of the polymerizable solutions included 0.5 percent by weight (of methylolated interpolymer) of dimethyl silicone fluid. The notes appended to Table D apply to Tables E, F, G and H.

TABLE E.—PROPERTIES OF METHYLOLATED INTERPOLYMERS AND DIBUTYL TIN DILAURATE (DBTL)

| Resin | Test | DBTL, wt. percent | Phosphoric acid, wt. percent | Sulfuric acid, wt. percent | Cure temperature, °C. | Cure time, minutes | Sward hardness, percent | Pencil hardness | Notes (See Table D) |
|---|---|---|---|---|---|---|---|---|---|
| I | xviii | 3 | 3 | 0 | 90 | 15 | 42 | | |
| | xix | 3 | 3 | 0 | *88 | 15 | 46 | | |
| | xx | 3 | 3 | 0 | *76 | 15 | 44 | | |
| | xxi | 3 | 3 | 0 | *60 | 15 | 42 | | |
| | xxii | 3 | 3 | 0 | *50 | 40 | 42 | | |
| | xxiii | 3 | 3 | 0 | *50 | 15 | 40 | | |
| | xxiv | 3 | 3 | 0 | *40 | 40 | 32 | | c, b |
| | xxv | 3 | 3 | 0 | *40 | 15 | 30 | | c, k |
| | xxvi | 3 | 0 | 0 | 177 | 10 | f | | k, j |
| | xxvii | 3 | 0 | 0 | 150 | 10 | f | | k, j |
| | xxviii | 3 | 0 | 0 | 125 | 10 | f | | k, j |
| III | viii | 3 | 0 | 3 | 125 | 10 | i | 5H | c |
| | ix | 3 | 0 | 3 | 100 | 10 | i | 5H | c |
| | x | 3 | 0 | 3 | 80 | 30 | i | 4H | d |
| IV | xi | 3 | 0 | 3 | *90 | 10 | f | | b, j |
| | xii | 3 | 3 | 0 | *90 | 30 | 40 | | d, j |
| | xiii | 3 | 3 | 0 | *90 | 60 | 46 | | j |
| | xiv | 3 | 0 | 3 | 80 | 30 | i | 3H | d |
| | xv | 3 | 0 | 3 | 60 | 30 | | H | j, b |
| | xvi | 3 | 0 | 3 | *50 | 30 | | H | j, b |
| V | vii | 3 | 0 | 3 | 125 | 10 | 52 | 3H | a |
| | viii | 3 | 0 | 3 | 100 | 30 | i | 3H | a |
| | ix | 3 | 0 | 3 | 80 | 30 | i | 3H | a |
| | x | 3 | 0 | 3 | 60 | 30 | | H | b, j |
| | xi | 3 | 0 | 3 | *50 | 30 | | H | b, j |

TABLE F.—PROPERTIES OF METHYLOLATED INTERPOLYMERS AND DIBUTYL TIN DICHLORIDE (DBTDC)

| Resin | Test | DBTDC, wt. percent | Phosphoric acid, wt. percent | Sulfuric acid, wt., percent | Cure temperature, °C. | Cure time, minutes | Sward Hardness, percent | Pencil Hardness | Notes (See Table D) |
|---|---|---|---|---|---|---|---|---|---|
| I | xxix | 3 | 0 | 0 | 177 | 10 | 42 | | d, j |
| | xxx | 3 | 0 | 0 | 150 | 10 | 38 | | b, j |
| | xxxi | 3 | 0 | 0 | 125 | 10 | | | k, j |
| | xxxii | 3 | 3 | 0 | 125 | 10 | 50 | | |
| | xxxiii | 3 | 3 | 0 | 100 | 30 | i | | |
| | xxxiv | 3 | 3 | 0 | 100 | 10 | 30 | | b |
| | xxxv | 3 | 3 | 0 | 80 | 10 | f | | b |
| | xxxvi | 3 | 3 | 0 | *90 | 10 | i | | b |
| | xxxvii | 3 | 3 | 0 | *90 | 30 | 44 | | c |
| | xxxviii | 3 | 3 | 0 | *90 | 60 | 48 | | |
| | xxxix | 3 | 0 | 3 | 125 | 10 | 62 | 5H | a |
| | xl | 3 | 0 | 3 | 100 | 30 | 50 | 3H | a |
| | xli | 3 | 0 | 3 | 80 | 30 | i | 3H | d |
| | xlii | 3 | 0 | 3 | 60 | 30 | | 1H | b |
| | xliii | 3 | 0 | 3 | *50 | 30 | | 2H | d |
| II | ix | 2 | 2 | 0 | 125 | 10 | 46 | | b |
| | x | 3 | 3 | 0 | 125 | 10 | 42 | | d, j |
| | xi | 2 | 2 | 0 | 100 | 30 | 52 | | b |
| | xii | 3 | 3 | 0 | 100 | 30 | 38 | | d, j |
| | xiii | 2 | 2 | 0 | *85 | 35 | 56 | | d |
| | xiv | 2 | 2 | 0 | *85 | 60 | 60 | | d |
| | xv | 2 | 2 | 0 | *100 | 15 | 52 | | d |
| | xvi | 2 | 2 | 0 | *100 | 30 | 52 | | d |
| III | xi | 3 | 0 | 3 | 150 | 10 | i | 4H | c |
| | xii | 3 | 0 | 3 | 125 | 10 | 70 | 4H | c |
| | xiii | 3 | 0 | 3 | 100 | 30 | 68 | 4H | c |
| | xiv | 3 | 0 | 3 | 80 | 30 | i | 4H | |
| IV | xvii | 3 | 0 | 3 | 125 | 10 | 64 | 3H | |
| | xviii | 3 | 0 | 3 | 100 | 30 | i | 3H | |
| | xix | 3 | 0 | 3 | 80 | 30 | i | 3H | |
| | xx | 3 | 0 | 3 | 60 | 30 | | 3H | d, j |
| | xxi | 3 | 0 | 3 | *50 | 30 | | 3H | d, j |
| V | xii | 3 | 0 | 3 | 125 | 10 | 52 | 3H | a |
| | xiii | 3 | 0 | 3 | 100 | 30 | i | 3H | a |
| | xiv | 3 | 0 | 3 | 80 | 30 | i | 3H | c |
| | xv | 3 | 0 | 3 | 60 | 30 | i | H | d, j |
| | xvi | 3 | 0 | 3 | *50 | 30 | i | H | d, j |

TABLE G.—PROPERTIES OF METHYLOLATED INTERPOLYMERS AND TRI-n-BUTYL BORATE (TNBB)

| Resin | Test | TNBB, wt. percent | Phosphoric acid, wt., percent | Sulfuric acid, wt., percent | Cure temperature, °C | Cure time, minutes | Sward Hardness, percent | Pencil Hardness | Notes (See Table D) |
|---|---|---|---|---|---|---|---|---|---|
| I | xliv | 3 | 3 | 0 | 125 | 10 | 48 | | |
|  | xlv | 3 | 3 | 0 | 100 | 10 | | | d |
|  | xlvi | 3 | 3 | 0 | 100 | 30 | | | |
|  | xlvii | 3 | 3 | 0 | 90 | 10 | | | b |
|  | xlviii | 3 | 3 | 0 | *90 | 10 | i | | b |
|  | xlix | 3 | 3 | 0 | *90 | 30 | i | | d |
|  | l | 3 | 3 | 0 | *90 | 60 | i | | |
|  | li | 3 | 3 | 0 | 177 | 10 | 40 | | j |
|  | lii | 3 | 0 | 0 | 150 | 10 | 36 | | |
|  | liii | 3 | 0 | 0 | 125 | 10 | f | | k, j |
|  | liv | 3 | 0 | 3 | 125 | 10 | i | 4H | a |
|  | lv | 3 | 0 | 3 | 100 | 30 | i | 3H | a |
|  | lvi | 3 | 0 | 3 | 80 | 30 | 42 | 2H | a |
|  | lvii | 3 | 0 | 3 | 60 | 30 | | H | b, j |
|  | lviii | 3 | 0 | 3 | *50 | 30 | | H | b, j |
| II | xv | 3 | 0 | 3 | 150 | 10 | i | 5H | l |
|  | xvi | 3 | 0 | 3 | 125 | 10 | i | 4H | l |
|  | xvii | 3 | 0 | 3 | 100 | 30 | 70 | 4H | c |
|  | xviii | 3 | 0 | 3 | 80 | 30 | i | 3H | c, d |
| IV | xxii | 3 | 0 | 3 | 125 | 10 | 56 | 3H | d |
|  | xxiii | 3 | 0 | 3 | 100 | 30 | 52 | 3H | d |
|  | xxiv | 3 | 0 | 3 | 80 | 30 | 50 | 3H | b, j |
|  | xxv | 3 | 0 | 3 | 60 | 30 | | H | b, j |
|  | xxvi | 3 | 0 | 3 | *50 | 30 | | H | a |
| V | xvii | 3 | 0 | 3 | 125 | 10 | 54 | 3H | a |
|  | xviii | 3 | 0 | 3 | 100 | 30 | 52 | 3H | c |
|  | xix | 3 | 0 | 3 | 80 | 30 | i | 3H | d, j |
|  | xx | 3 | 0 | 3 | 60 | 30 | | H | d, j |
|  | xxi | 3 | 0 | 3 | *50 | 30 | | H | |

TABLE H.—PROPERTIES OF METHYLOLATED INTERPOLYMERS AND DI-PHENYL PHENYL PHOSPHONITE (DPPP)

| Resin | Test | DPPP, wt., percent | Phosphoric acid, weight, percent | Sulfuric acid, wt., percent | Cure temperature, °C | Cure time, minutes | Sward Hardness, percent | Pencil Hardness | Notes (See Table D) |
|---|---|---|---|---|---|---|---|---|---|
| II | xvii | 3 | 3 | 0 | 125 | 10 | 56 | | j |
|  | xviii | 3 | 3 | 0 | 100 | 10 | 48 | | d, j |
|  | xix | 3 | 3 | 0 | 100 | 30 | 52 | | j |
|  | xx | 3 | 3 | 0 | *90 | 10 | i | | b, j |
|  | xxi | 3 | 3 | 0 | *90 | 30 | i | | j |
|  | xxii | 3 | 3 | 0 | *90 | 100 | i | | d, j |

The quantities of acid and ester in the polymerizable solution should be in the range of about 0.1 to 2.0 moles (of acid plus ester) for each amide site in the inntcrpolymer. The ratio of acid-to-ester in the additive may range from about 0.1 to 10.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. A coating composition adapted for being hardened into a flexible hard, infusible, glossy film on baking at temperatures below 100° C. after application for a period of 10 to 30 minutes comprising as essential ingredients a polymer formed by vinyl addition of an ethylenically unsaturated amide and at least one ethylenically unsaturated monomer copolymerizable therewith, the amide sites of said polymer being methylolated whereby from 0.5 to 2.0 methylol groups are included in the polymer for each said amide site, and an additive comprising a quantity of aqueous acid selected from the class consisting of sulfuric acid, phosphoric acid and their mixtures and an ester selected from the class consisting of dibutyl tin dilaurate, dibutyl tin dichloride, tri-n-butyl borate and diphenyl phenyl phosphonite, the said essential ingredients being carried in a solvent.

2. The composition of claim 1 wherein the said ethylenically unsaturated amide is selected from the class consisting of acrylamide and methacrylamide.

3. The composition of claim 1 wherein the said ethylenically unsaturated monomer is selected from the class consisting of styrene, vinyl toluene, divinyl benzene, acrylic acid, methacrylic acid, acrylic esters and methacrylic esters.

4. The composition of claim 1 wherein the said solvent is n-butanol.

5. The composition of claim 1 wherein the said polymer is formed by vinyl addition of from 10 to 50 parts by weight of an ethylenically unsaturated amide and from 90 to 50 parts by weight of at least one ethylenically unsaturated monomer.

6. A coating composition adapted for being hardened into a flexible, hard, infusible glossy film on baking at temperatures below 100° C. after application for a period of 10 to 30 minutes comprising as essential ingredients a polymer formed by vinyl addition of from 10 to 50 parts by weight of an ethylenically unsaturated amide selected from the class consisting of acrylamide and methacrylamide and from 90 to 50 parts by weight of at least one ethylenically unsaturated monomer copolymerizable therewith, the amide sites of said polymer being methylolated whereby from 0.5 to 2.0 methylol groups are included in the polymer for each said amide site, and 0.1 to 2.0 moles of an additive for each said amide site, said additive comprising a first acid component selected from the class consisting of 20 to 70 percent aqueous sulfuric acid, 20 to 85 percent aqueous phosphoric acid and their mixtures, and a second ester component selected from the class consisting of dibutyl tin dilaurate, dibutyl tin dichloride, tri-n-butyl borate and diphenyl phenyl phosphonite, the said essential ingredients being carried in a solvent.

7. The coating composition of claim 6 wherein the mole ratio of said first acid component to said second ester component in said additive is from 0.1 to 10.

8. The coating composition of claim 6 wherein said ester component is dibutyl tin dilaurate.

9. The coating composition of claim 6 wherein said ester component is dibutyl tin dichloride.

10. The coating composition of claim 6 wherein said ester component is tri-n-butyl borate.

11. The coating composition of claim 6 wherein said ester component is diphenyl phenyl phosphonite.

12. The method of coating a metal surface with a flexible, hard infusible glossy film which comprises applying to said surface a film which comprises as essential ingredients a polymer formed by vinyl addition of an ethylenically unsaturated amide and at least one ethylenically unsaturated monomer copolymerizable therewith, the amide sites of said polymer being methylolated whereby from 0.5 to 2.0 methylol groups are included in the polymer for each said amide site, and an additive comprising a first acid component selected from the class consisting of sulfuric acid, phosphoric acid and their mixtures and a second ester component selected from the class consisting of dibutyl tin dilaurate, dibutyl tin dichloride, tri-n-butyl borate and diphenyl phenyl phosphonite, the said essential ingredients being carried in a solvent, and heating said film to a curing temperature below 100° C. for a curing time less than about 30 minutes.

13. The method of claim 12 wherein an infra-red heat source is provided for heating the said film.

References Cited in the file of this patent

UNITED STATES PATENTS

| | | |
|---|---|---|
| 2,718,515 | Thomas | Sept. 20, 1955 |
| 2,789,101 | Wilson | Apr. 16, 1957 |
| 2,789,107 | Weinberg et al. | Apr. 16, 1957 |
| 2,870,116 | Vogel et al. | Jan. 20, 1959 |
| 2,870,117 | Vogel et al. | Jan. 20, 1959 |
| 2,940,943 | Christenson et al. | June 14, 1960 |

OTHER REFERENCES

Mason et al.: "The Technology of Plastics and Resins," D. Van Nostrand Co., Inc., New York, page 192.